United States Patent [19]

Dunbar et al.

[11] 4,156,668

[45] May 29, 1979

[54] AQUEOUS BINDER COMPOSITION COMPRISING A POLYVINYL ACETATE AND A POLYESTER USEFUL FOR GLASS FIBER MATS

[75] Inventors: Sidney G. Dunbar, Granville; Jeffery L. Antle, Newark, both of Ohio

[73] Assignee: Owens-Corning Fiberglas Corporation, Toledo, Ohio

[21] Appl. No.: 876,071

[22] Filed: Feb. 8, 1978

[51] Int. Cl.² ............................................. C08L 31/04
[52] U.S. Cl. ............................. 260/29.6 NR; 428/430
[58] Field of Search ................ 260/29.6 NR; 428/430

[56] References Cited

U.S. PATENT DOCUMENTS

| | | | |
|---|---|---|---|
| 2,511,895 | 6/1950 | Bacon | 260/29.6 NR |
| 2,611,756 | 9/1952 | Pöckel | 260/29.6 NR |
| 2,951,772 | 9/1960 | Marzocchi et al. | 260/29.6 NR |
| 3,336,253 | 8/1967 | Wong | 260/29.6 NR |

*Primary Examiner*—Maurice J. Welsh
*Attorney, Agent, or Firm*—Ronald C. Hudgens; Philip R. Cloutier; James B. Wilkens

[57] ABSTRACT

A glass mat, the fibers of which are sized with a size comprising a polyester compatible material, the fibers of the mat being bonded with an emulsion bonding agent comprising a polyvinyl acetate and a polyester.

10 Claims, No Drawings

AQUEOUS BINDER COMPOSITION COMPRISING A POLYVINYL ACETATE AND A POLYESTER USEFUL FOR GLASS FIBER MATS

This invention relates to emulsion-bonded mat. In one of its more specific aspects, this invention relates to emulsion bonded mats comprised of mineral fibers.

The use of mats comprised of mineral fibers is well known. Such mats, generally known as chopped strand mats, are typically used in contact molding processes as reinforcements in the manufacture of boats, automotive parts and the like. In these uses, mats comprising mineral strands, most frequently glass strands coated with a size, are formed by bonding the strands together with a powdered polyester binder, the binder being soluble in the solvent contained in room temperature curable resin into which the mats are incorporated for strength purposes.

There has now been invented a chopped strand mat binder comprising a polyvinyl acetate-polyester emulsion, the emulsion being employed in conjunction with the glass strands sized with a polyester compatible size. This combination of size and binder provides a glass mat having low stiffness and excellent dry comformability which characteristics provide good drape properties; that is, the mat can be easily pressed into a mold and made to conform to the mold shape.

In addition, the binder possesses excellent solubility in monomers such as styrene Also, the mat possesses excellent wet comformability to the mold and has a fast wet-through with the result that a greater freedom in styling of part shapes is permitted. Also, due to a high porosity allowing easy air removal, the time and labor required to roll out the material is substantially reduced. Furthermore, the mat being a bonded structure, is not subject to fragmentation during handling with the result that little dust is dispersed into the atmosphere. In addition, this mat may be used as a gel coat back up mat, a unique property for a coarse stranded mat.

Accordingly, there is provided by this invention a glass mat comprising a plurality of fibers, the fibers having adhered to at least a portion of their surface the residue formed by evaporation of water from an aqueous composition comprising a polyester-compatible material, said fibers being maintained in adhering relationship by the solids produced by evaporating the aqueous component of an aqueous composition comprising a polyvinyl acetate and a polyester, and an antifoaming agent dispersible in the water, said polyester consisting essentially of the reaction product of tetraethylene glycol and adipic acid.

The mat of the present invention can employ any glass fiber of such characteristics that the fiber can be chopped and dispensed in the form of a mat. Preferably, glass fibers having diameters within, but not limited to, the range of from about 0.00035 to about 0.00090 inch will be used, such fibers being chopped to, but not limited to, a length of about two inches after having been sized and the sizing dried.

The fibers will be sized upon attenuation or immediately thereafter with an aqueous composition comprising a polyester compatible material, preferably a water soluble epoxide, the size also preferably containing an organo silane coupling agent.

The glass fibers, which have been gathered into strands are sized, dried, chopped and deposited in the form of a mat having a weight within, but not limited to, a range of from about one and one-half to about three and one-half ounces per square foot. The binder containing the polyvinyl acetate and the polyester, preferably in the form of an emulsion, is supplied to the mat from a flooding wier according to conventional practices. Excess binder which flows through the mat can be collected in a binder catch pan and returned to the binder feed system.

The mat containing the binder passes, in the usual manner, over an extraction section where excess emulsion is removed from the mat, air being passed through the mat to facilitate the stripping of the excess emulsion from the mat. The mat is dried and cured using conventional ovens and drying techniques. As the hot, dry mat leaves the oven, ambient air at about 70° F., for example, is drawn through the mat to cool it from about 300° F. to a temperature less than about 140° F. At temperatures less than about 150° F., the binder solidifies and the mat is then passed through water-cooled compaction rolls to finish setting the resinous binder.

The mat next passes through an additional cooling section and other processing steps which facilitate it's preparation for shipment.

The size composition of this invention will be comprised of a water soluble epoxide in an amount within the range of from about 1 to about 6 weight percent, preferably in amount within the range of from about 3.0 to about 4.0. In the preferred embodiment, the water soluble epoxide will be present in an amount of about 3.50 weight percent.

Any suitable water soluble epoxide can be employed. A particularly suitable water soluble epoxide is represented by the formula:

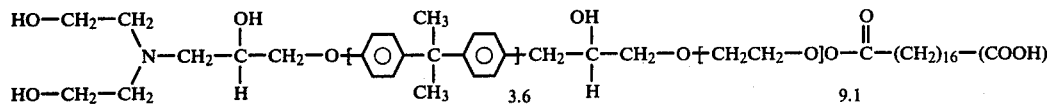

The method for the production of this particular water soluble epoxide and others suitable for use is described in U.S. Pat. No. 3,336,253, the disclosure of which is hereby incorporated by reference.

The size composition will comprises an organo silane coupling agent in an amount within the range of from about 0.01 to about 1.00 weight percent, preferably in an amount within the range of from about 0.05 to about 0.50. In the preferred embodiment, the organo silane coupling agent will be present in an amount of about 0.1 weight percent.

Any suitable organo silane coupling agent can be employed. A particularly suitable organo silane coupling agent is gamma-methacryloxypropyltrimethoxysilane commercially available from Union Carbide under the trade designation "A-174".

Glacial acetic acid will be present in the aqueous size composition in an amount within the range of from about 0.10 to about 0.50 weight percent and preferably in amount of about 0.25 weight percent.

Ammonium chloride will be present in the aqueous size composition in an amount within the range of from about 0.0004 to about 0.40 weight percent and preferably in an amount of about 0.04 weight percent. Chromium nitrate, either in crystal form or in a 50% water solution, will be present in the aqueous size composition in amount within the range of from about 0.01 to about 0.50 weight percent and preferably in an amount of about 0.16 weight percent.

The aqueous emulsion mat binder of this invention will contain a polyvinyl acetate emulsion in an amount within the range of from about 4 to about 6 weight percent and preferably in an amount of about 5.2 weight percent. A suitable polyvinyl acetate emulsion can be obtained commerically as "78-3802" from National Starch and Chemical Company, S. Plainfield, N.J.

The emulsion mat binder of this invention will contain a polyester which is the reaction product of tetra-ethylene glycol and adipic acid employed in equi-molar quantities and which has an acid value within the range of from about 10 to about 20. The polyester will be used in an amount within the range of from about 1 to about 3 weight percent and preferably in an amount of about 2 weight percent. A suitable polyester can be obtained by usual reaction techniques which involve heating the tetra-ethylene glycol to about 200° F., adding the adipic acid and heating the mixture up to about 340° F. while removing distillate and, finally, heating the reaction mixture up to about 440° F. and maintaining the reaction mixture at a temperature for a period sufficient to produce a polyester having an acid value within the above range, a 140 viscosity within the range of from about 115 to about 170 cp. at 350° F. and a refractive index within the range of from about 1.4735 to about 1.4745.

The mat binder will also preferably, contain a water dispersable anti-foaming agent. One suitable material is commercially available as "ANTIFOAM B" from Dow Corning Corporation. The antifoaming agent will be present in amount within the range of from about 0.010 to about 0.015 weight percent. Preferably, an amount of about 0.012 weight percent will be employed.

Water will comprise the balance of the mat binder, being present in an amount of about 93 weight percent such that the binder contains an amount of solids within the range of from about 3.0 to about 9.0 and preferably about 7.2 weight percent.

The preparation of a composition of this invention is illustrated by the following examples.

EXAMPLE 1

This example demonstrates the best mode for preparing 100 gallons of a size composition of this invention.

About 55 gallons of demineralized water at a temperature of 75+/− 5° F. were added to a main mix tank with stirring.

About 10 gallons of demineralized water at a temperature of about 75+/− 5° F. were added to a first pre-mix tank with stirring.

Next, about 0.2 pound of glacial acetic acid was introduced into the contents of the first premix tank with stirring.

About 0.8 pound of gamma-methacryloxypropyltrimethoxysilane (A-174) was added to the contents of the first premix tank with stirring.

Next, about 1.3 pounds of chromium nitrate crystals were dissolved in about gallon of demineralized water and the solution added to the contents of the first pre-mix tank with stirring.

The contents of the first pre-mix tank were then introduced into the contents of the main mix tank with stirring.

About 21 pounds of water soluble epoxide (previously described) and about 1.9 pounds of glacial acetic acid were added to a second pre-mix tank with stirring.

In order to emulsify this acetic acid and water soluble epoxide mixture, demineralized water at a temperature of about 75+/− 5° F. was added to the second pre-mix tank until an emulsion inversion point was reached. Stirring was continued for about 15 minutes and the contents of the second pre-mix tank were introduced into the contents of the main mix tank with stirring.

About 0.3 pound of ammonium chloride was dissolved in about 1 gallon of demineralized water at a temperature of about 135+/− 5° F. and the ammonium chloride pre-mix was introduced into the contents of the main mix tank with stirring.

The resulting solution was recovered as a size composition of this invention. About 800 glass filaments each having a diameter of about 0.00045 inches were gathered into a plurality of strands which were sized with the above prepared size such that an amount of size within the range of from about 0.32 to 0.46% based upon loss on ignition, was deposited on the fibers based upon the weight of the sized fibers.

The resulting strand was oven dried and chopped to product fibers having lengths of about 2 inches. These were then distributed in the form of a mat weighing about 1.5 to 3.5 ounces per square foot.

EXAMPLE 2

This example demonstrates the best mode for preparing a binder composition of this invention.

The binder is prepared by first preparing an anti-foam pre-mix by dilluting about 6.6 pounds of a water-miscible anti-foaming agent "ANTIFOAM B" with about 40 pounds of deionized water at about 60° F.

A polyester is then prepared by reacting tetraethylene glycol and adipic acid in an equal molar ratio at a maximum temperature of about 440° F. to produce about 1166 pounds of the polyester. This is prepared as previously described to produce a product having an acid value of about 15.

A mixture of the polyester and polyvinyl acetate is then prepared by introducing about 5620 pounds of polyvinyl acetate, available, for example as "PVAc78-3802, from National Starch and Chemical Company, S. Plainfield, N.J., into a mix tank and adding about 260 pounds of deionized water thereto. The previously-prepared 1166 pounds of polyester are then slowly introduced into the mix tank at a rate of 20 pounds per minute and, after mixing for an additional two hours after all the polyester has been added, 1500 pounds of water are added at a rate of 80 pounds per minute. The antifoam pre-mix is then added and agitated for 15 minutes before separating off the 8593 pound batch into 20 drums each containing about 430 pounds of emulsion concentrate.

About 1290 pounds of emulsion concentrate are placed in a 1,000 gallon mix tank and filled to 1,000 gallons with water.

Aqueous emulsion binder is deposited on the 1.5 to 3.5 ounce mat at a rate which thoroughly wets the mat. The excess binder is allowed to flow from the mat and the mat is passed over an extraction section. Air is passed through the mat at a rate sufficient to strip the excess binder from the mat but at a rate which allows the fibers of the mat to remain thoroughly wetted by the binder; that is, the weight of the mat is increased due to binder to pickup in an amount within the range of from about 40 to about 100 weight percent based upon the total weight of the mat. The mat is dried and cured at a temperature within a range of from 290° to about 425° F. Upon leaving the oven, ambient air at about 70° F. is drawn through the mat to cool it to about 140° F. at which temperature the binder solidified. The mat is then passed through cooling rolls at a temperature of about 50° to 70° F. to set the resinous binder. The final binder content is about 5%.

The mat can then be passed through additional cooling rolls to reduce this temperature so that the mat can be handled for cutting, slitting, rolling and related procedures prior to its being incorporated into resin systems in which the binder is soluble and the solvent contained in the resin system.

It will be evident from the foregoing that various modifications can be made to this invention. Such, however, are considered to be within the scope of the invention.

What is claimed is:

1. An aqueous binder composition comprising water, a polyvinyl acetate and a polyester, said polyester consisting essentially of the reaction product of tetraethylene glycol and adipic acid.

2. The composition of claim 1 in which said tetraethylene glycol and said adipic acid are reacted in equimolar quantities.

3. The composition of claim 1 in which said reaction product has an acid value within the range of from about 10 to about 20.

4. The composition of claim 1 in which said polyester is contained in an amount within the range of from about 1 to about 3 weight percent.

5. The composition of claim 1 in which said polyester has a viscosity within the range of from about 115 to about 170 centipoises at 350° F.

6. The composition of claim 1 also including a water dispersible anti-foaming agent.

7. A mat comprising a plurality of glass fiber and a residue formed by removing water from the aqueous composition defined in claim 1.

8. The mat of claim 7 in which a size is positioned on said glas fibers, said size comprising a polyester-compatible material.

9. The mat of claim 8 in which said polyester-compatible material is a water-soluble epoxide.

10. The mat of claim 9 in which said sizing also contains an organo silane coupling agent.

* * * * *